FARQUHAR & DOAN.
Evaporating Pan.
No. 58,236. Patented Sept. 25, 1866.
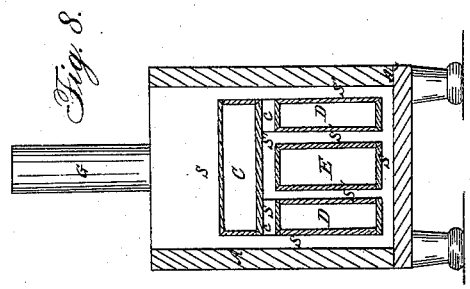
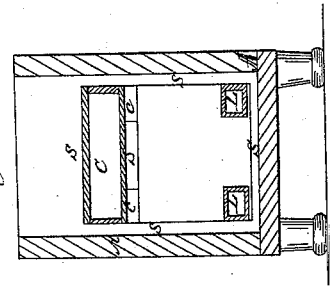
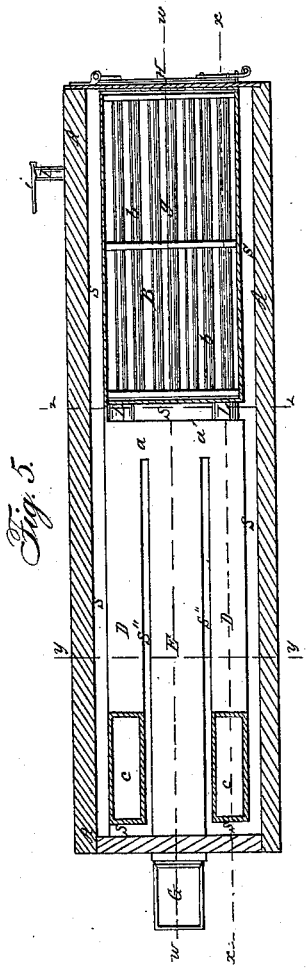
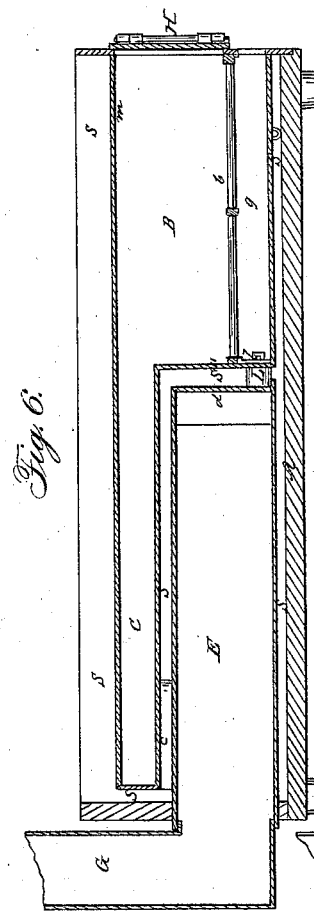
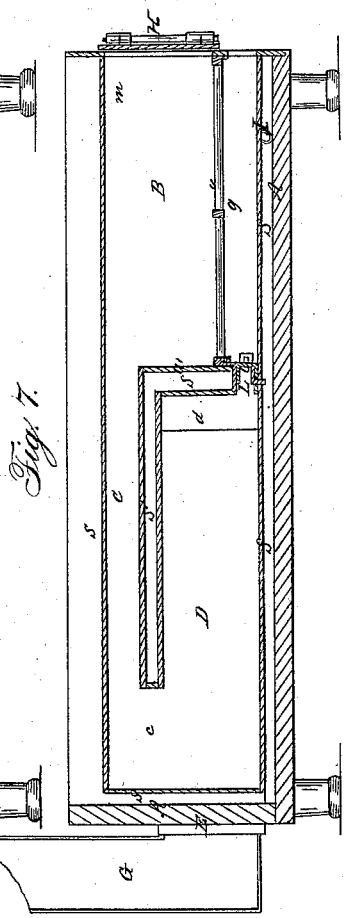
Witnesses:
Wm. F. Browne
Thomas Tasker
Inventor:
Francis Farquhar
Robert E. Doan
By their atty
J. A. Brown

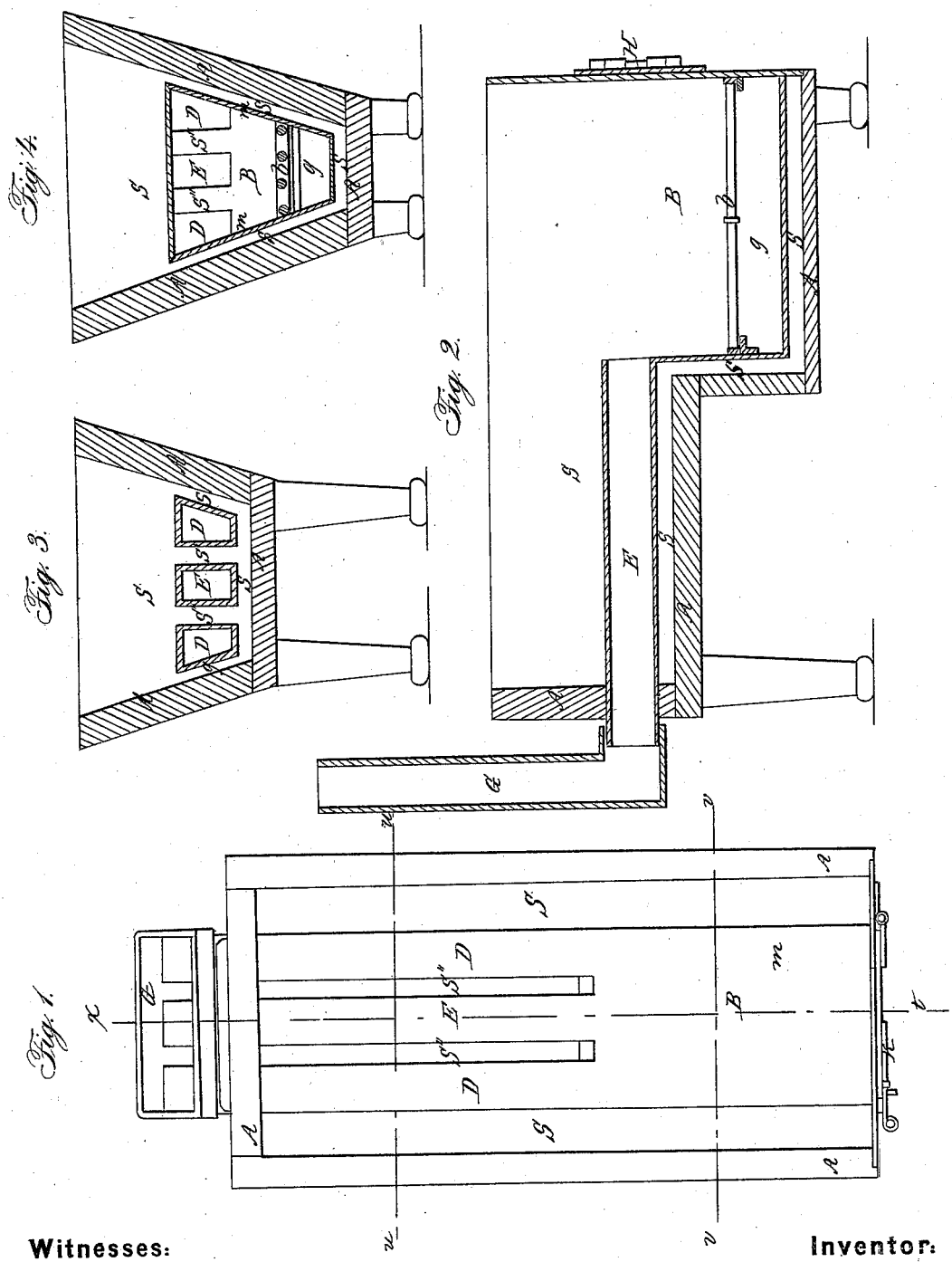
FARQUHAR & DOAN.
Evaporating Pan.
No. 58,236. Patented Sept. 25, 1866.

UNITED STATES PATENT OFFICE.

FRANCIS FARQUHAR AND R. E. DOAN, OF WILMINGTON, OHIO.

IMPROVED EVAPORATOR.

Specification forming part of Letters Patent No. 58,236, dated September 25, 1866.

*To all whom it may concern:*

Be it known that we, FRANCIS FARQUHAR and ROBERT E. DOAN, of Wilmington, in the county of Clinton and State of Ohio, have invented a new and Improved Sugar-Evaporator; and we do hereby declare that the following is a full and exact description thereof, reference being had to the accompanying drawings, making part of this specification—

Figure 1 being a top view of a simple direct-flue evaporator constructed in our improved manner; Fig. 2, a longitudinal vertical section thereof, in a plane indicated by the line $t\,t$, Fig. 1; Figs. 3 and 4, transverse vertical sections thereof in planes respectively indicated by the lines $u\,u$ and $v\,v$, Fig. 1; Fig. 5, a horizontal section (through the upper flue) of a return-flue evaporator constructed in our improved manner; Figs. 6 and 7, longitudinal vertical sections thereof in planes respectively indicated by the lines $w\,w$ and $x\,x$, Fig. 5; Figs. 8 and 9, transverse vertical sections thereof in planes respectively indicated by the lines $y\,y$ and $z\,z$, Fig. 5.

Like letters designate corresponding parts in all the figures.

The main feature of our invention consists in surrounding the fire-box and flues with the liquid to be evaporated, so as to get the full effect of the heat from all the radiating-surfaces of the fire-box and flues wherever practicable. We also have specific features of improvement in arrangement and combination, which will be hereinafter specified.

The arrangements for carrying out the leading feature of our invention may be various. We herein describe its application, first, with simple direct-flues, as shown in Figs. 1, 2, 3, and 4; and also with both direct and return flues, as represented in Figs. 5, 6, 7, 8, and 9.

In the first or simplest arrangement of simple direct-flues we conveniently employ a wooden box, A, which contains the sorghum-juice, or other liquid, to be evaporated. The fire-box B, including the ash-pit and draft-chamber $g$, and the flues D D and E are made of sheet-iron, and are formed and situated in the box A so as to be, so to speak, concentric therein, or so as to leave spaces S S S between them and the sides of the box all around, except at the front end of the fire-box, where access is had thereto through the door H, and where the flues pass out through the rear end of the box to communicate with the smoke-pipe G. These spaces, at the sides, rear end, and bottom of the fire-box and flues may be, therefore, of nearly uniform thickness—say, one and one-half or two inches—and between the flues there may be about the same width of spaces S'' S''. The flues D D and E being all direct, there may be as many with evaporating-spaces between them as convenient and desirable.

In the more complicated and more efficient arrangement with direct and return flues, as represented in Figs. 5, 6, 7, 8, and 9, the box A, fire-box B, with its ash-pit and draft-chamber $g$, and door H, may be as in the former case, except as to form and dimensions, which are not important; but, instead of two or three direct-flues, we first make a broad flue, C, in the top of and the whole width of the flue-case. Thence there are flue-connections $c\,c$ leading directly downward at the rear end, and opening into two side return-flues, D D, substantially of the form and proportions shown in the drawings. Thence flue-connections $d\,d$ from both of these return-flues lead inward, near the front end of the flue-work, into a single central direct-flue, E, which extends straight backward to the smoke-pipe G, and is of sufficient size to conduct all the products of combustion supplied by the two return-flues D D. In this case not only are the side, back, and bottom evaporating-spaces S S S similar to the arrangement described above for the direct-flue evaporator, but there is a similar space, S', between the top flue, C, and those beneath, and spaces S'' S'' between the side flues, D D, and central flue, E, and another space, S''', between the forward end of the said flues D D E and the fire-box B. Thus the evaporating-space is greatly increased.

We also employ, if desirable, direct-flue connections L L between the fire-box B and the flues D D, but they are ordinarily closed by plugs $l\,l$. They are convenient also for getting access to those flues for cleaning out, when occasion may require.

The return-flues and their connections with the direct-flues also cause the fire-draft to impinge several times in succession directly against the surrounding surfaces, thus more rapidly causing it to part with its heat, and to impart it to the liquid to be evaporated.

The cold juice is let into the evaporator at the rear end, and, being heavier than the heated juice, first descends to the bottom and thence flows forward alongside of the return-flues D D, and, coming in contact with the fire-box, where the heat is the most intense, the glutinous matter therein becomes cooked or coagulated, and, rising to the surface, it brings up with it the impurities, and thence floats backward on the top of the liquid to near the rear end of the evaporator, where it becomes quiescent, and does not mix with the liquid any more, and where it may be skimmed off at leisure. This arrangement of the flues, &c., thus produces a very desirable result, obviating, as it does, constant attendance, as with other evaporators, for taking off the scum as it rises. The concentrated sirup is finally drawn off at a spigot, I, with a gate, $i$, near the front end of the box.

What we claim as our invention, and desire to secure by Letters Patent, is—

1. A sugar-evaporator having its fire-box and flues arranged so as to be surrounded with the juice to be evaporated, substantially as and for the purpose herein specified.
2. The arrangement of the direct and return flues C D D and E, in relation to the introduction and flow of the juice to be evaporated, so as to separate the impurities to be skimmed off, substantially as herein set forth.
3. The evaporating-space $S'''$, between the flues D D E and the fire-box, as described.
4. The flue-connections L L, between the fire-box B and flues D D, for the purpose set forth.

The above specification of our improved sugar-evaporator signed by us this 18th day of May, A. D. 1866.

FRANCIS FARQUHAR.
ROBT. E. DOAN.

In presence of—
LEVI MILLS,
CUSH LEACH.